United States Patent [19]

Miyata

[11] Patent Number: 4,761,188

[45] Date of Patent: * Aug. 2, 1988

[54] FILIFORM CORROSION-RESISTANT PRIMER COATING COMPOSITION AND METHOD FOR PREVENTING FILIFORM CORROSION

[75] Inventor: Shigeo Miyata, Takamatsu, Japan

[73] Assignee: Kyowa Chemical Industry Co., Ltd., Tokyo, Japan

[*] Notice: The portion of the term of this patent subsequent to Jun. 23, 2004 has been disclaimed.

[21] Appl. No.: 29,153

[22] Filed: Mar. 23, 1987

[51] Int. Cl.$^4$ .................. C23C 22/24; C08K 3/26
[52] U.S. Cl. .................. 148/6.2; 148/6.14 R; 148/6.27; 524/395; 524/398; 524/399; 524/404; 524/413; 524/417; 524/423; 524/424; 524/429; 524/431; 524/436
[58] Field of Search .............. 524/395, 398, 399, 423, 524/424, 434, 417, 431, 429, 404, 413, 436, 437; 427/388.2; 148/6.14 R, 6.2, 6.27

[56] References Cited

U.S. PATENT DOCUMENTS

| | | | |
|---|---|---|---|
| 4,600,762 | 7/1986 | Fukui et al. | 526/348.6 |
| 4,611,024 | 9/1986 | Wolfe | 524/354 X |
| 4,613,525 | 9/1986 | Miyamoto et al. | 427/256 |
| 4,613,644 | 9/1986 | Moritana et al. | 524/430 |
| 4,634,744 | 1/1987 | Hwang et al. | 526/84 |
| 4,675,356 | 6/1987 | Miyata | 524/424 |

Primary Examiner—Thurman K. Page
Attorney, Agent, or Firm—Sherman and Shalloway

[57] ABSTRACT

A filiform corrosion-resistant primer coating composition for use in application to a metallic substrate, comprising a film forming component containing a film-forming resinous material and a hydrotalcite component, characterized in that the hydrotalcite component is a hydrotalcite solid solution represented by the following formula (1)

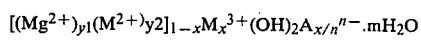

$$[(Mg^{2+})_{y1}(M^{2+})_{y2}]_{1-x}M_x^{3+}(OH)_2A_{x/n}^{n-}\cdot mH_2O$$

wherein $M^{2+}$ represents at least one divalent metal cation selected from the group consisting of Zn, Cd, Pb, Ca and Sr, $M^{3+}$ represents a trivalent metal cation, $A^{n-}$ represents an anion having a valence of n, and x, y1, y2 and m represent positive numbers which satisfy the following conditions:
$0 < x \leq 0.5$,
$0 < y1$,
$0 < y2$,
$0.5 \leq y1+y2 < 1$, and
$0 \leq m < 2$, the amount of the hydrotalcite solid solution being 0.1 to 20 parts by weight per 100 parts by weight of the film-forming component.

13 Claims, No Drawings

FILIFORM CORROSION-RESISTANT PRIMER COATING COMPOSITION AND METHOD FOR PREVENTING FILIFORM CORROSION

This invention relates to a primer coating composition which is useful for preventing or inhibiting filiform corrosion which may occur in various metallic substrates such as iron, zinc, aluminum, magnesium and chrome-plated nickel coated with a coating composition containing a film-forming resin component such as an acrylic resin paint or an aminoalkyd resin paint when they are placed in air at a high relative humidity of 65 to 95%; and to a method of preventing filiform corrosion by using the primer coating composition.

When various organic resin-coated metallic products such as containers, furniture, electrical appliances and devices and automobiles are placed under high humidity, the surface of the substrate metal (such as iron, zinc, aluminum, magnesium or chrome-plated nickel) frequently undergoes corrosion in the form of linear corrosion products which look like numerous winding threads. When the substrate metal is iron which is most useful in practice, thread-like corrosions formed on the iron surface frequently measure about 0.1 to 0.5 mm in width and assume a red color which is characteristic of $Fe_2O_3$. The head portions of the thread-like corrosions are green to blue and show the presence of a ferrous ion. Usually, the thread-like corrosions grow at a rate of about 0.4 mm a day and extend in random directions, but do not cross each other. This type of corrosion is called "filiform corrosion".

Filiform corrosion does not easily occur when the coated film is considerably impervious to water. Hence, the mechanism of occurrence of filiform corrosion is considered to be a typical example of the formation of a differential aeration cell (oxygen concentration cell).

One prior method known to prevent filiform corrosion comprises treating the surface of a metallic substrate with a phosphate such as iron phosphate or zinc phosphate, and applying a resin paint to the phosphate-treated surface to form a coated film layer on it. This method, however, is unable to inhibit filiform corrosion satisfactorily.

Japanese Laid-Open Patent Publication No. 166568/1984 (laid open on Sept. 19, 1984) proposes a filiform corrosion-resistant coating composition comprising 100 parts by weight of a film-forming resin component and 0.5 to 20 parts by weight of hydrotalcite. This patent document describes the use of hydrotalcite of any one of the compositions $Mg_4Al_2(OH)_{12}CO_3.3H_2O$, $Mg_6Al_2(OH)_{16}CO_3.5H_2O$ and $Mg_6Al_2(OH)_{16}CO_3.4H_2O$. Investigations of the present inventors, however, have shown that the coating composition proposed in the above patent document comprising a film-forming component including a film-forming resinous material and the above hydrotalcite component shows an improved effect against filiform corrosion over a coating composition not containing the above hydrotalcite component, but this effect is still unsatisfactory and is desired to be improved further.

In filiform corrosion, for example, that on iron, its head portion becomes acidic with the formation of $Fe^{2+}$. Furthermore, that part of the metal to which the coated film is applied or that part of the filiform corrosion which follows the head portion becomes a cathode and permits accumulation of $OH^-$. If, therefore, the acid at the head portion is neutralized rapidly and continuously over an extended period of time and the concentration of $OH^-$ accumulated in the "cathode" portion is decreased, it would be possible to inhibit a reaction of forming an oxygen concentration cell due to differential aeration which is the mechanism of filiform corrosion.

The three hydrotalcite compounds described in the above-cited Japanese Laid-Open Patent Publication No. 166568/1984 are effective neutralizing agents and also take a counter ion for a metal ion, for example, a Cl ion in $FeCl_2$, into the structure of hydrotalcite by ion exchange reaction and thus inhibits a secondary corrosion reaction of the Cl ion. In spite of the expectation that the hydrotalcite would produce a satisfactory effect of preventing filiform corrosion because of its action mentioned above, its effect ascertained by the present inventors is not fully satisfactory.

The present inventors made investigations in order to develop a filiform corrosion-reisistant coating composition which can achieve an excellent improved effect, and consequently assumed that in the hydrotalcite compounds suggested in the above patent document represented by $Mg_4Al_2(OH)_{12}CO_3.3H_2O$, $Mg_6Al_2(OH)_{16}CO_3.5H_2O$ and $Mg_6Al_2(OH)_{16}CO_3.4H_2O$, the acid neturalizing reaction shown by these compounds depends on $CO_3^{2-}$ in the structure and therefore the maximum neutralization capacity is about 3.5 to 4.09 meq/g; moreover, these $CO_3^{2-}$ hydrotalcite compounds do not participate in the acid neutralization reaction unless the pH of the system is less than about 3; and that these are the main cause of inability to achieve satisfactory results. Further investigations have led to the discovery that a markedly improved effect of inhibiting filiform corrosion can be achieved by using a specific hydrotalcite solid solution having at least two kinds of divalent metallic cation in which part of the divalent metal cation $Mg^{2+}$ is replaced by at least one other divalent metal cation selected from Zn, Cd, Pb, Ca and Sr cations.

Investigations of the present inventors have shown that a hydrotalcite solid solution represented by the following formula (1)

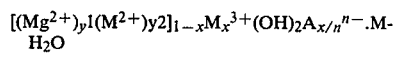

wherein $M^{2+}$ represents at least one divalent metal cation selected from the group consisting of Zn, Cd, Pb, Ca and Sr, $M^{3+}$ represents a trivalent metal cation, $A^{n-}$ represents an anion having a valence of n, and x, y1, y2 and m represent positive numbers which satisfy the following conditions:

$0 < x \leq 0.5$,
$0 < y1$,
$0 < y2$,
$0.5 \leq y1 + y2 < 1$, and
$0 \leq m < 2$, is very useful for achieving the aforesaid improved effect.

The reason for this is not entirely clear, but the present inventors presume that the main factors for the achievement of the improved effect in this invention are that in the hydrotalcite solid solution represented by formula (1), part of the divalent metal cation $Mg^{2+}$ is replaced by at least one other divalent metal cation selected from Zn, Cd, Pb, Ca and Sr which have an evidently larger ionic radius than the magnesium ion, and that the solid solution has an increased speed of neutralization on acids than the aforesaid hydrotalcites previously suggested and shows an increase in neutralizing capacity by at least 50%. Another factor which is presumed to be conducive to the achievement of the improved effect is that the hydrotalcite solid solution of formula (1) has increased reactivity with $OH^-$ which deleteriously affects the adhesion of the coated film to a metal substrate and facilitates intrusion of oxygen.

It is an object of this invention, therefore, to provide an improved filiform corrosion-resistant primer coating composition for use in application to a metallic substrate, comprising a film-forming component including a film-forming resinous material, and a hydrotalcite component.

Another object of this invention is to provide a method for inhibiting filiform corrosion by using the aforesaid coating composition.

The above and other objects and advantages of this invention will become apparent from the following description.

According to the invention, there is provided, in a filiform corrosion-resistant primer coating composition for use in application to a metallic substrate, comprising a film forming component containing a film-forming resinous material and a hydrotalcite component, the improvement wherein the hydrotalcite component is a hydrotalcite solid solution represented by the following formula (1)

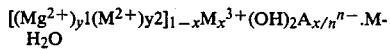

wherein $M^{2+}$ represents at least one divalent metal cation selected from the group consisting of Zn, Cd, Pb, Ca and Sr, $M^{3+}$ represents a trivalent metal cation, $A^{n-}$ represents an anion having a valence of n, and x, y1, y2 and m represent positive numbers which satisfy the following conditions:

$0 < x \leq 0.5$,
$0 < y1$,
$0 < y2$,
$0.5 \leq y1 + y2 < 1$, and
$0 \leq m < 2$, the amount of the hydrotalcite solid solution being 0.1 to 20 parts by weight per 100 parts by weight of the film-forming component.

In the hydrotalcite solid solution of formula (1), $M^{2+}$ is at least one divalent metal cation selected from the group consisting of Zn, Cd, Pb, Ca and Sr. Of these, Zn and Pb, particularly Zn, are preferred.

In formula (1), $M^{3+}$ is a trivalent metal cation such as Al, Bi, Fe and Cr.

$A^{n-}$ in formula (1) represents an anion having a valence of n, such as $I^-$, $OH^-$, $HCO_3^-$, $CO_3^{2-}$, a salicylate ion, $CrO_4^{2-}$,

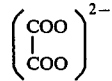

and $[Fe(CN)_6]^{4-}$.

In formula (1), x is a positive number represented by $0 < x \leq 0.5$, preferably $0.2 \leq x \leq 0.5$, preferably $0.2 \leq x \leq 0.4$. y1 and y2 are positive numbers represented by $0 < y1$, $0 < y2$ and $0.5 \leq y1 + y2 < 1$. m is a number represented by $0 \leq m < 2$. y1 and y2 are preferably $0.3 \leq y1 \leq 0.6$, $0.1 \leq y2 \leq 0.4$ and $0.5 \leq y1 + y2 \leq 0.9$.

The hydrotalcite solid solution represented by formula (1) which is used in the present invention has a similar crystal structure to hydrotalcite $Mg_6Al_2(OH)_{16}CO_3.4H_2O$ and therefore shows a powder X-ray diffraction pattern similar to that of the hydrotalcite. The lattice constant of the hydrotalcite solid solution of formula (1), however, changes in accordance with the general law of solid solutions. Specifically, as the amount of $M^{2+}$ having a larger ionic radius than $Mg^{2+}$ dissolved increases or the ionic radius of $M^{2+}$ is larger, the lattice constant of the solid solution of formula (1) increases as compared with the case of hydrotalcite in which Mg is the only divalent metal cation.

Preferably, the hydrotalcite solid solution of formula (1) used in this invention is dispersed as fine particles in order to improve the adhesion of the coated film to the substrate metal further, prevent intrusion of substances causing filiform corrosion, such as air or water, to the interface between the metal and the coated film, and to perform the neuralization of the acid and the reaction with alkali $OH^-$ more efficiently. From this standpoint, the hydrotalcite solid solution of formula (1) preferably has an average secondary particle diameter of about 0.1 to 2 micrometers and a specific surface area of not more than about 30 $m^2/g$, especially not more than about 20 $m^2/g$ (crystal particles are defined as primary particles and particles resulting from agglomeration of the crystal particles are defined as secondary particles).

Preferably, prior to use, the solid solution of formula (1) is treated in air or in an atmosphere of an inert gas such as $N_2$ and He at about 120° to 350° C. for about 1 to 40 hours to remove water of crystallization (in which case m becomes substantially zero). As a result of this heat-treatment to remove water of crystallization, the hydrotalcite solid solution has an increased ability to inhibit filiform corrosion.

The hydrotalcite solid solution particles of formula (1) in this invention may be treated with a surface-treating agent, and this is a preferred embodiment where an oily coating composition is to be formed. When the coating composition desired is an aqueous coating composition, it is better not to perform the surface treatment.

Examples of the surface treating agent are higher fatty acids, anionic surface-active agents, silane coupling agents, titanate coupling agents and esters between glycerol and fatty acids. Specific examples include higher fatty acids such as stearic acid, oleic acid and lauric acid, anionic surface-active agents such as sodium stearate, sodium oleate and sodium laurylbenzenesulfonate, silane or titanate coupling agents such as vinyltriethoxysilane, gamma-methacryloxypropyltriethoxysilane, isopropyltriisostearoyltitanate and isopropyltridecylbenzenesulfonyl titanate; and glycerol fatty acid esters such as glycerol monostearate and glycerol monooleate. The surface-treatment of the hydrotalcite solid solution of formula (1) may be carried out by mechanically mixing it with a powder or aqueous suspension of the hydrotalcite solid solution when the surface-treating agent is liquid or a solution in water or an alcohol. When the surface-treating agent melts under heating, it may be mixed mechanically with a powder the hydrotalcite solid solution under heat-melting conditions. After thorough mixing, the mixture may be subjected to suitable means such as washing with water, dehydration, drying, pulverizing and classification to obtain the surface-treated product.

The amount of the surface-treating agent used in the above surface treatment may be properly changed. Usually, it is about 0.1 to 10% by weight based on the weight of the hydrotalcite solid solution of formula (1).

The hydrotalcite solid solution of formula (1) used as an active ingredient of the filiform corrosion-resistance coating composition of this invention may be produced by methods known per se except a component capable of giving $Mg^{2+}$ and at least one component capable of giving the other metal cation $M^{2+}$ are used in combination. For example, the known manufacturing methods described in Japanese Patent Publications Nos. 2280/1971 (corresponding to U.S. Pat. Nos. 3,539,306 and 3,650,704), 32198/1972 (corresponding to U.S. Pat. No. 3,879,523), 30039/1975 and 29129/1976 may be used except that a component capable of giving $Mg^{2+}$ and at least one component capable of giving the other divalent metal cation are $M^{2+}$ are used in combination. The hydrotalcite solid solution of formula (1) having a BET specific surface area of less than about 30 $m^2/g$ and an average secondary particle diameter of less than about 2 micrometers can be obtained preferably by heat-treating the solid solution produced as above further in, for example, an aqueous medium.

According to this preferred embodiment, the hydrotalcite solid solution of formula (1) obtained by the aforesaid method is heat-treated, for example, in an autoclave in an aqueous medium at a temperature of, for example, about 120° to 250° C., for a period of, for example, about 5 to 40 hours to give a hydrotalcite solid solution of formula (1) having the desired BET specific surface area and average secondary particle diameter. The above heat-treatment may be hydrothermally carried out under pressure until the desired BET specific surface area and average secondary particle diameter are attained. Higher temperatures are preferred. Treating temperatures higher than about 230° C. could be used, but no special advantage can be obtained by so doing. Accordingly, temperatures in the aforesaid range are preferably used.

In the coating composition of this invention, the film forming component containing the film-forming resinous material is well known in the field of paint. Various film-forming components are known according to the type of paints. The film-forming component may contain, in addition to the film-forming resinous material, various known paint additives, for example coloring agents such as pigments and dyes, fillers such as silica, titanium dioxide, zinc oxide, calcium carbonate, magnesium carbonate, calcium sulfate and aluminum hydroxide, coating aids such as alcohols and surface-active agents, and thickening agents such as synthetic smectite and hectorite. The type of the paint may be a powder paint, an oily paint, an aqueous paint, or any other known types of paint.

The film-forming resinous material may be any paint resin known per se. Examples include aminoalkyd resins, baking-type acrylic resins, air drying acrylic resins, air drying vinyl chloride resins, boiled oil, phenolic resins, oil-modified butadiene resins, isobutylene/maleic anhydride copolymer resin, epoxy resins, vinylidene chloride-type latices, xylene resin, coumarone resin, ketone resins, polyterpene resins, polyvinyl ether, polyvinyl butyral resin and maleic acid resin.

The filiform corrosion-resistant primer coating composition of this invention comprises 100 parts by weight of the film-forming component and 0.1 to 20 parts by weight, preferably 1 to 10 parts by weight, of the hydrotalcite solid solution of formula (1). If the amount of the hydrotalcite solid solution used is too small below, the above quantitative range, it is difficult to obtain a satisfactory effect of inhibiting filiform corrosion. If it is too large beyond the specified range, no corresponding effect of inhibiting filiform corrosion can be obtained and rather it adds to the cost.

According to another aspect of this invention, there is provided, in a method of inhibiting filiform corrosion which may occur on the surface of a metallic substrate, which comprises applying a primer coating composition comprising a film-forming component containing a film-forming resinous material and a hydrotalcite component to the substrate surface to form a coated film layer thereon, the improvement wherein the hydrotalrite component of the coating composition is a hydrotalcite solid solution represented by the following formula (1)

wherein $M^{2+}$ represents at least one divalent metal cation selected from the group consisting of Zn, Cd, Pb, Ca and Sr, $M^{3+}$ represents a trivalent metal cation, $A^{n-}$ represents an anion having a valence of n, and x, y1, y2 and m represent positive numbers which satisfy the following conditions:
$0 < x \leq 0.5$,
$0 < y1$,
$0 < y2$,
$0.5 \leq y1 + y2 < 1$, and
$0 \leq m < 2$,
the amount of the hydrotalcite solid solution being 0.1 to 20 parts by weight per 100 parts by weight of the film-forming component.

Means of applying the coating composition to the metallic substrate are known per se, and there can be used, for example, spray coating, brush coating, roll coating, air knife coating, doctor blade coating, extrusion coating, dip coating, powder coating, electrostatic coating and gravure coating in this invention.

Examples of the metallic substrate to which the coating composition of this invention is to be applied are iron, zinc, aluminum, magnesium and chrome-plated nickel on which filiform corrosion usually form. The surface of the metallic substrate may be subjected to a usual cleaning treatment and then coated with the coating composition of the invention. The coating composition of the invention may also be coated on a chemically treated metallic substrate which is obtained by subjecting it to a conventional pre-treatment for depositing iron phosphate or zinc phosphate as crystals on its surface. This further increases the filiform corrosion inhibiting effect of the coating composition of the invention.

The following examples illustrate the present invention more specifically.

The test on filiform corrosion was carried out as follows:

A cut having a width of about 1/16 to 3/32 inch reaching the metallic substrate was formed on the coated film of the coated metallic substrate to expose the metallic substrate to view. A 5% aqueous sodium chloride solution was sprayed in splash at 35° C. The sprayed substrate was then exposed to an atmosphere having a temperature of 80° C. and a relative humidity of 80% for 20 days. The maximum length of the filiform corrosion which occurred at the cut part was measured, and made a measure of filiform corrosion.

EXAMPLE 1

A powder of hydrotalcite solid solution having the composition $Mg_{0.4}Zn_{0.3}Al_{0.3}(OH)_2(CO_3)_{0.15} \cdot 0.55H_2O$ having a secondary particle diameter of 0.2 micrometer and a BET specific surface area of 15 m²/g was added to an aqueous solution of sodium stearate (0.01 mole/liter) at 80° C. with stirring to a concentration of about 100 g/liter. The mixture was stirred for about 30 minutes, dehydrated, dried and pulverized. The surface-treated hydrotalcite solid solution in powder was uniformly dispersed in a paint thinner comprising xylene as a main component to a concentration of about 10% by weight/volume by treating it for about 30 minutes by a homomixer. The dispersion was added to a commercial baking-type acrylic paint so that the content of the hydrotalcite solid solution became 2% by weight based on the film-forming component of the paint.

The mixture was adjusted to a viscosity suitable for spray coating by adding a thinner. The resulting coating composition was spray-coated on a steel plate having a thickness of 0.8 mm to a dry film thickness of about 50 micrometers, and then baked at 140° C. for 20 minutes. The coated steel plate was subjected to the above filiform corrosion test. It was found that the maximum length of the filiform corrosion was 2.2 mm.

COMPARATIVE EXAMPLE 1

A coating composition was prepared as in Example 1 except that hydrotalcite of the composition $Mg_{0.7}Al_{0.8}(OH)_2CO_3 \cdot 0.55H_2O$ having a secondary particle diameter of 0.5 micrometer and a BET specific surface area of 12 m²/g was used instead of the hydrotalcite solid solution used in Example 1. The resulting coating composition was coated and baked, and subjected to the filiform corrosion test as in Example 1. It was found that the maximum length of the filiform corrosion was 3.1 mm.

COMPARATIVE EXAMPLE 2

A coating composition similar to that in Example 1 was prepared except that the hydrotalcite solid solution was not included. The coating composition was similarly coated, baked and tested. It was found that the maximum length of the filiform corrosion was 8.4 mm.

EXAMPLE 2

A powder of the same surface-treated hydrotalcite solid solution as used in Example 1 (secondary particle diameter 0.6 micrometer, BET specific surface area 17 m²/g) was dried in vacuum at 200° C. for 2 hours to remove water of crystallization and to form hydrotalcite solid solution having the composition $Mg_{0.4}Zn_{0.3}Al_{0.3}(OH)_2(CO_3)_{0.15}$. Example 1 was repeated except that the resulting hydrotalcite solid solution was used instead of the hydrotalcite solid solution used in Example 1. It was found that the maximum length of the filiform corrosion was 1.2 mm.

EXAMPLE 3

A powder of hydrotalcite solid solution of the composition $Mg_{0.5}Pb_{0.22}Al_{0.28}(OH)_2I_{0.28} \cdot 0.16H_2O$ having a secondary particle diameter of 0.6 micrometer and a BET specific surface area of 12 m²/g was dispersed in a paint thinner by the same method as in Example 1. The dispersion was then added in an amount of 3% by weight based on the film-forming component to a commercial aminoalkyd paint. The coating composition was adjusted to a viscosity suitable for spraying by further adding a thinner. The resulting coating composition was spray-coated on a zinc phosphate-treated steel sheet having a thickness of 0.8 mm (the amount of adhesion was 2 g/m²) to a dry film thickness of about 40 micrometers, and baked at 140° C. for 30 minutes. The resulting coated plate was subjected to the filiform corrosion test. It was found that the maximum length of the filiform corrosion was 0.8 mm.

COMPARATIVE EXAMPLE 3

Example 3 was repeated except that the hydrotalcite solid solution was not used to prepare the coating composition. The maximum length of the filiform corrosion was 7.3 mm.

COMPARATIVE EXAMPLE 4

Example 3 was repeated except that hydrotalcite of the composition $Mg_{0.75}Al_{0.25}(CO_3)_{0.125} \cdot 0.50H_2O$ was used instead of the hydrotalcite solid solution used in Example 3. It was found that the maximum length of the filiform corrosion was 2.8 mm.

What is claimed is:

1. In a filiform corrosion-resistant primer coating composition for use in application to a metallic substrate, comprising a film forming component containing a film-forming resinous material and a hydrotalcite component, the improvement wherein the hydrotalcite component is a hydrotalcite solid solution represented by the following formula (1)

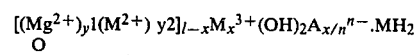

$$[(Mg^{2+})_{y1}(M^{2+})_{y2}]_{1-x}M_x^{3+}(OH)_2 A_{x/n}^{n-} \cdot mH_2O$$

wherein $M^{2+}$ represents at least one divalent metal cation selected from the group consisting of Zn, Cd, Pb, Ca and Sr, $M^{3+}$ represents a trivalent metal cation, $A^{n-}$ represents an anion having a valence of n, and x, y1, y2 and m represent positive numbers which satisfy the following conditions:

$0 < x \leq 0.5$,
$0 < y1$,
$0 < y2$,
$0.5 \leq y1 + y2 < 1$, and
$0 \leq m < 2$, the amount of the hydrotalcite solid solution being 0.1 to 20 parts by weight per 100 parts by weight of the film-forming component.

2. The primer coating composition of claim 1 wherein in formula (1), $M^{3+}$ is a trivalent metal cation selected from the group consisting of Al, Bi, Fe and Cr.

3. The primer coating composition of claim 1 wherein in formula (1), x, y1, y2 and m are positive numbers which satisfy the following conditions:

$0.2 \leq x \leq 0.5$,
$0.3 \leq y1 \leq 0.6$,
$0.1 \leq y2 \leq 0.4$,
$0.5 \leq y1 + y2 \leq 0.9$, and
$0 \leq m < 2$.

4. The primer coating composition of claim 1 wherein $A^{n-}$ in formula (1) is an anion selected from the group consisting of $I^-$, $OH^-$, $HCO_3^-$, $CO_3^{2-}$, a salicylate ion, $CrO_4^{2-}$,

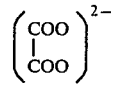

and [Fe(CN)$_6$]$^{4-}$.

5. A method of inhibiting filiform corrosion which may occur on the surface of a metallic substrate, which comprises applying a primer coating composition comprising a film-forming component containing a film-forming resinous material and a hydrotalcite component to the substrate surface to form a coated film layer thereon, the improvement wherein the hydrotalcite component of the coating composition is a hydrotalcite solid solution represented by the following formula (1)

$[(Mg^{2+})_{y1}(M^{2+})_{y2}]_{l-x}M_x^{3+}(OH)_2A_{x/n}{}^{n-} \cdot nH_2O$ wherein $M^{2+}$ represents at least one divalent metal cation selected from the group consisting of Zn, Cd, Pb, Ca and Sr, $M^{3+}$ represents a trivalent metal cation, $A^{n-}$ represents an anion having a valence of n, and x, y1, y2 and m represent positive numbers which satisfy the following conditions:

$0 < x \leq 0.5$,
$0 < y1$,
$0 < y2$,
$0.5 \leq y1 + y2 < 1$, and
$0 \leq m < 2$, the amount of the hydrotalcite solid solution being 0.1 to 20 parts by weight per 100 parts by weight of the film-forming component.

6. The method of inhibiting filiform corrosion of claim 5 wherein in formula (1), $M^{3+}$ is a trivalent metal cation selected from the group consisting of Al, Bi, Fe and Cr.

7. The method of inhibiting filiform corrosion of claim 5 wherein in formula (1), x, y1, y2 and m are positive numbers which satisfy the following conditions $0.2 \leq x \leq 0.5$,
$0.3 \leq y1 \leq 0.6$,
$0.1 \leq y2 \leq 0.4$,
$0.5 \leq y1 + y2 \leq 0.9$, and
$0 \leq m < 2$.

8. The method of inhibiting filiform corrosion of claim 5 wherein $A^{n-}$ in formula (1) is an anion selected from the group consisting of I$^-$, OH$^{31}$, HCO$_3^-$, CO$_3^{2-}$, a salicylate ion, CrO$_4^{2-}$,

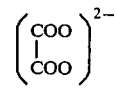

and (Fe(CN)$_6$)$^{4-}$.

9. The primer coating composition of claim 1 wherein the hydrotalcite solid solution has an average secondary particle diameter of from about 0.1 to 2 micrometers, and a specific surface area of not more than about 30 m$^2$/g.

10. The primer coating composition of claim 1 wherein the amount of the hydrotalcite solid solution is from 1 to 10 parts by weight per 100 parts per weight of the film-forming component.

11. The primer coating composition of claim 1 wherein the hydrotalcite solid solution has the composition formula Mg$_{0.4}$Zn$_{0.3}$Al$_{0.3}$(OH)$_2$(CO$_3$)$_{0.15}$·0.55H$_2$O).

12. The primer coating composition of claim 1 wherein the hydrotalcite solid solution has the composition formula Mg$_{0.4}$Zn$_{0.3}$Al$_{0.3}$(OH)$_2$(CO$_3$)$_{0.15}$.

13. The primer coating composition of claim 1 wherein the hydrotalcite solid solution has the composition formula Mg$_{0.5}$Pb$_{0.22}$Al$_{0.28}$(OH)$_2$I$_{0.28}$·0.16H$_2$O.

* * * * *

UNITED STATES PATENT AND TRADEMARK OFFICE
CERTIFICATE OF CORRECTION

PATENT NO. : 4,761,188
DATED : August 2, 1988
INVENTOR(S) : SHIGEO MIYATA

It is certified that error appears in the above-identified patent and that said Letters Patent is hereby corrected as shown below:

Claim 8, line 3 of the claim, "$OH^{31}$" should read --$OH^-$--.

Claim 9, line 3 of the claim "2micrometers" should read --2 micrometers--.

Signed and Sealed this

Twenty-ninth Day of November, 1988

*Attest:*

DONALD J. QUIGG

*Attesting Officer*  *Commissioner of Patents and Trademarks*